(12) United States Patent
Aldrich et al.

(10) Patent No.: US 8,704,908 B1
(45) Date of Patent: Apr. 22, 2014

(54) METHOD AND APPARATUS FOR MULTIPLE ZONE STATISTICS COLLECTION FOR DIGITAL IMAGE/VIDEO CAPTURE SYSTEMS

(75) Inventors: Bradley C. Aldrich, Austin, TX (US); Adam George, Austin, TX (US); Matthew P. Wingert, Cedar Park, TX (US); Hongxin Li, Shanghai (CN)

(73) Assignee: Marvell International Ltd., Hamilton (BM)

( * ) Notice: Subject to any disclaimer, the term of this patent is extended or adjusted under 35 U.S.C. 154(b) by 534 days.

(21) Appl. No.: 12/611,451

(22) Filed: Nov. 3, 2009

Related U.S. Application Data

(60) Provisional application No. 61/110,776, filed on Nov. 3, 2008, provisional application No. 61/225,861, filed on Jul. 15, 2009.

(51) Int. Cl.
*H04N 5/228* (2006.01)

(52) U.S. Cl.
USPC .................................. 348/222.1

(58) Field of Classification Search
USPC .......... 348/221.1, 223.1, 225.1, 229.1, 230.1, 348/254, 345, 349, 353, 356, 362, 364; 382/173, 254
See application file for complete search history.

(56) References Cited

U.S. PATENT DOCUMENTS

| | | | | |
|---|---|---|---|---|
| 5,659,357 A * | 8/1997 | Miyano | ...................... | 348/223.1 |
| 6,947,080 B2 * | 9/2005 | Ikeda | ...................... | 348/223.1 |
| 7,184,080 B2 * | 2/2007 | Kehtarnavaz et al. | ...... | 348/223.1 |
| 7,200,264 B2 * | 4/2007 | Hubel et al. | .................. | 382/167 |
| 7,397,502 B2 * | 7/2008 | Shiraishi | .................... | 348/223.1 |
| 7,505,069 B2 * | 3/2009 | Wang | ......................... | 348/223.1 |
| 8,031,236 B2 * | 10/2011 | Sa | ............... | 348/223.1 |
| 8,106,961 B2 * | 1/2012 | Nakamura | .................. | 348/223.1 |
| 8,330,772 B2 * | 12/2012 | Cote et al. | ...................... | 345/611 |
| 2006/0177128 A1 * | 8/2006 | Raghupathy et al. | ......... | 382/167 |
| 2009/0129695 A1 * | 5/2009 | Aldrich et al. | ................ | 382/261 |

\* cited by examiner

*Primary Examiner* — Lin Ye
*Assistant Examiner* — Chriss Yoder, III

(57) ABSTRACT

A system includes a block module, a zone module, a statistics module, and a control module. The block module is configured to associate pixel values generated by pixel sensors of an image sensor with M regions. The zone module is configured to define N zones in the M regions. Each of the N zones includes an adjustable number of the M regions. N and M are integers greater than one and N is less than or equal to M. The statistics module is configured to gather statistics corresponding to the N zones. The control module is configured to adjust pixel values generated by the pixel sensors based on the statistics.

20 Claims, 9 Drawing Sheets

FIG. 5B

| Zone Map Address | Zone |
|---|---|
| 000000 | 000 |
| 000001 | 000 |
| 000010 | 000 |
| 000011 | 000 |
| 000100 | 000 |
| 000101 | 000 |
| 000110 | 000 |
| 000111 | 000 |
| 001000 | 000 |
| 001001 | 001 |
| 001010 | 001 |
| 001011 | 000 |
| 001100 | 000 |
| 001101 | 110 |
| 001110 | 110 |
| 001111 | 000 |
| ... | ... |
| 111111 | 000 |

FIG. 5A

| Column Address \ Row Address | 000 | 001 | 010 | 011 | 100 | 101 | 110 | 111 |
|---|---|---|---|---|---|---|---|---|
| 111 | Z0 7 | Z0 15 | Z0 23 | Z0 31 | Z0 39 | Z0 47 | Z0 55 | Z0 63 |
| 110 | Z0 6 | Z2 14 | Z2 22 | Z0 30 | Z0 38 | Z7 46 | Z7 54 | Z0 62 |
| 101 | Z0 5 | Z2 13 | Z4 21 | Z5 29 | Z5 37 | Z7 45 | Z7 53 | Z0 61 |
| 100 | Z0 4 | Z0 12 | Z5 20 | Z5 28 | Z5 36 | Z0 44 | Z0 52 | Z0 60 |
| 011 | Z0 3 | Z0 11 | Z5 19 | Z5 27 | Z5 35 | Z0 43 | Z0 51 | Z0 59 |
| 010 | Z0 2 | Z1 10 | Z3 18 | Z5 26 | Z5 34 | Z6 42 | Z6 50 | Z0 58 |
| 001 | Z0 1 | Z1 9 | Z1 17 | Z0 25 | Z0 33 | Z6 41 | Z6 49 | Z0 57 |
| 000 | Z0 0 | Z0 8 | Z0 16 | Z0 24 | Z0 32 | Z0 40 | Z0 48 | Z0 56 |

METHOD AND APPARATUS FOR MULTIPLE ZONE STATISTICS COLLECTION FOR DIGITAL IMAGE/VIDEO CAPTURE SYSTEMS

CROSS-REFERENCE TO RELATED APPLICATIONS

This application claims the benefit of U.S. Provisional Application No. 61/110,776, filed on Nov. 3, 2008 and U.S. Provisional Application No. 61/225,861, filed on Jul. 15, 2009. The disclosures of the above applications are incorporated herein by reference in their entirety.

FIELD

The present disclosure relates to systems and methods for gathering pixel information in an imaging system, and more particularly to systems and methods for gathering pixel information in multiple zones of an image.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, an image capture system 10 includes a lens assembly 12 that directs incident light onto a sensor module 14. The image capture system 10 may capture still images and/or video. The lens assembly 12 directs light from a scene image (hereinafter "scene") onto an image sensor 16 of the sensor module 14. The image sensor 16 may include a charge-coupled device (CCD) or a complementary metal-oxide-semiconductor (CMOS) active pixel sensor. The image sensor 16 includes an integrated circuit having a pixel array. Each pixel includes a photo-detector that produces a signal based on an intensity of the incident light received by that pixel.

A color filter array (CFA) 18 (e.g., a Bayer filter array) is arranged between the lens assembly 12 and the pixel array. The CFA 18 includes color filters that pass red, green, or blue light. The CFA 18 typically includes two green color filters for each red and blue color filter. Each of the pixels of the image sensor 16 corresponds to a single color of the CFA 18. Accordingly, pixels corresponding to red, green, or blue filters detect an intensity of red, green, or blue light, respectively. The sensor module 14 reads out signals from the image sensor 16. Digital values corresponding to signals read out from the image sensor 16 may be referred to as "RAW data."

An image processing module 34 implements an image processing pipeline that processes the RAW data for output to a device. For example, the processed RAW data may be output to a display device and/or a storage device 36.

SUMMARY

A system comprises a block module, a zone module, a statistics module, and a control module. The block module is configured to associate pixel values generated by pixel sensors of an image sensor with M regions. The zone module is configured to define N zones in the M regions. Each of the N zones includes an adjustable number of the M regions. N and M are integers greater than one and N is less than or equal to M. The statistics module is configured to gather statistics corresponding to the N zones. The control module is configured to adjust pixel values generated by the pixel sensors based on the statistics.

In other features, the statistics module includes N histograms corresponding to N sets of the statistics. Each of the N histograms includes counts corresponding to pixel values.

In other features, the control module adjusts pixel values to perform at least one of an auto-white balance operation, an auto-exposure operation, and an auto-focus operation.

In other features, the counts corresponding to pixel values are based on chromaticity values.

In other features, the control module adjusts pixel values to perform an auto-white balance operation based on at least one of the N histograms.

In still other features, a method comprises associating pixel values generated by pixel sensors of an image sensor with M regions. The method further comprises defining N zones in the M regions. Each of the N zones includes an adjustable number of the M regions. N and M are integers greater than one and N is less than or equal to M. The method further comprises gathering statistics corresponding to the N zones and adjusting pixel values generated by the pixel sensors based on the statistics.

In other features, the method comprises determining N histograms corresponding to N sets of the statistics. Each of the N histograms includes counts corresponding to pixel values.

In other features, the method comprises adjusting pixel values to perform at least one of an auto-white balance operation, an auto-exposure operation, and an auto-focus operation.

In other features, the counts corresponding to pixel values are based on chromaticity values.

In other features, the method comprises adjusting pixel values to perform an auto-white balance operation based on at least one of the N histograms.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 5A is an illustration of zone values that correspond to row and column addresses of the active region according to the present disclosure;

FIG. 5B is a table that illustrates zone values and corresponding zone map addresses according to the present disclosure;

DESCRIPTION

Figure 1:
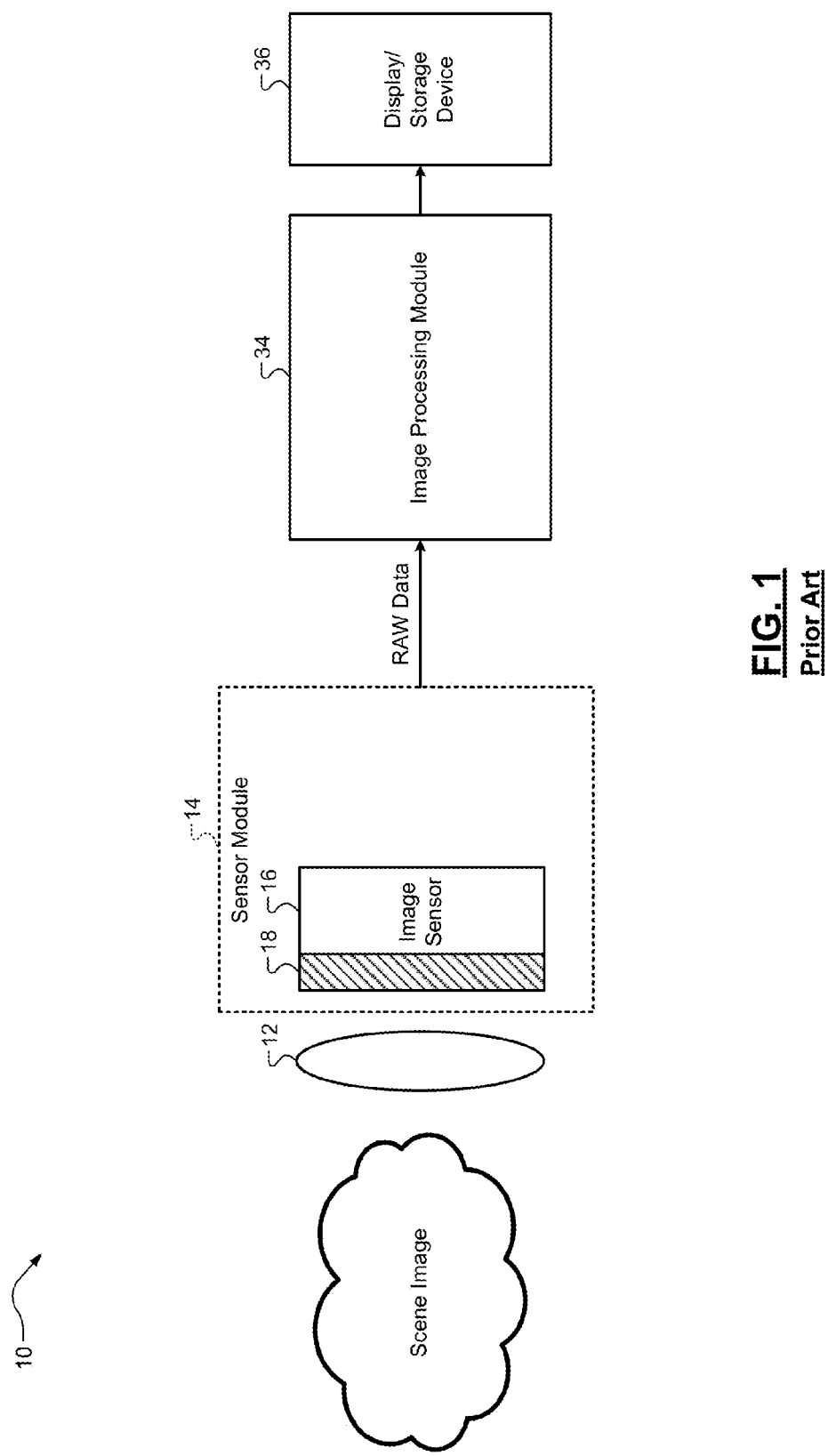
FIG. 1 is a functional block diagram of an image capture system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
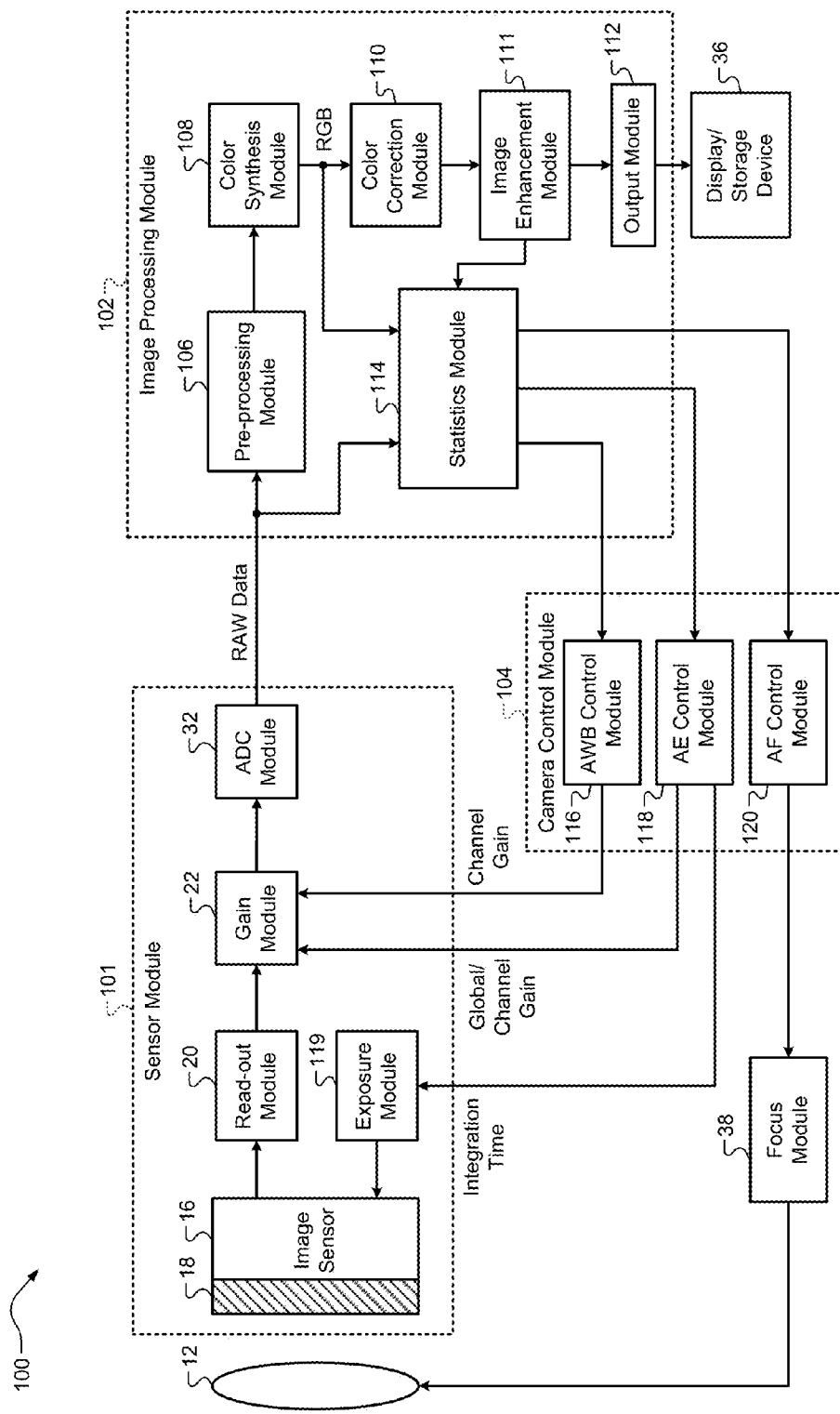
FIG. 2 is a functional block diagram of an image capture system that includes multiple zone statistical analysis according to the present disclosure.

Referring now to FIG. 2, an image capture system 100 including multiple zone statistical analysis (hereinafter "multi-zone system 100") is shown. The multi-zone system 100 includes the lens assembly 12, a focus module 38, a sensor module 101, an image processing module 102, a camera control module 104, and the display/storage device 36.

A read-out module 20 reads out signals corresponding to each pixel of the image sensor 16. Signals corresponding to the red, green, and blue pixels may hereinafter be referred to as the red (R), green (G1/G2), and blue (B) channels, respectively. The read-out module 20 may indicate the location of each pixel as each pixel is read out of the image sensor 16. In a two dimensional image sensor 16, for example, the location of each pixel may be described by a row address (i.e., a Y coordinate) and a column address (i.e., an X coordinate).

The gain module 22 may apply a gain (hereinafter "channel gain") to the signals read out from the image sensor 16. The gain module 22 may apply a channel gain to one or more of the channels (R, G1, G2, B). The channel gain may be modified based on various operations of the multi-zone system 100. Operations may include an auto-white balance (AWB) operation, an auto-exposure (AE) operation, and an auto-focus (AF) operation. The camera control module 104 includes an AWB control module 116, an AE control module 118, and an AF control module 120 that perform the AWB operation, the AE operation, and the AF operation, respectively.

An analog-to-digital conversion (ADC) module 32 converts analog signals read out by the read-out module 20 to digital values. Digital values corresponding to the signals read out by the read-out module 20 may be referred to as "RAW data." For example, the RAW data may include 10 or 12 bit RAW data (i.e., RAW10/RAW12), depending on a resolution of the ADC module 32. The signals read out from the image sensor 16 and the corresponding digital values may be referred to as "pixel values."

The image processing module 102 implements an image processing pipeline that processes the RAW data for output to the display device and/or a storage device 36. The image processing module 102 may perform various image processing operations. For example, the image processing module 102 may perform a black level clamp operation, a vignetting correction operation, a color synthesis (demosaicing) operation, a color correction operation, and conversion of RGB data to another format (e.g., YCbCr 422/420).

The AWB control module 116 performs the AWB operation. The AWB control module 116 may adjust the channel gains via the gain module 22 to perform the AWB operation. In one embodiment, the AWB control module 116 may adjust each of the channel gains individually to adjust a white point of the image. The AWB operation may adjust the channel gains based on an analysis of the type of illumination in the image. Accordingly, the AWB operation may adjust the channel gains in order to compensate for the type of illumination.

The AE control module 118 performs the AE operation. The AE control module 118 may adjust the channel gains via the gain module 22 to perform the AE operation. The AE operation may adjust the channel gains based on an analysis of the level of illumination in the image. Accordingly, the AE operation may adjust the channel gains in order to compensate for the level of illumination. The AE control module 118 may adjust the gain applied to all channels (i.e., R, G, and B) using a global gain adjustment. The AE control module 118 may also adjust each of the channels individually using different channel gains.

An exposure module 119 may provide an integration time to the image sensor 16. The AE control module 118 may adjust the integration time via the exposure module 119 to perform the AE operation.

The AF control module 120 performs the AF operation. The AF control module 120 may adjust the lens assembly 12 via the focus module 38 to perform the AF operation. The AF operation may adjust the lens assembly 12 based on edge detail determined by the image processing module 102. The focus module 38 may actuate a motor (not shown) in order to control the lens assembly 12.

The image processing module 102 includes a pre-processing module 106, a color synthesis module 108, a color correction module 110, an image enhancement module 111, an output module 112, and a statistics module 114. The pre-processing module 106 performs various operations on RAW data received from the sensor module 14. The pre-processing module 106 may perform a dead pixel correction operation, a black level clamp operation, a linearization operation, an optical vignetting correction, and/or a digital white balance gain operation. The pre-processing module 106 may also perform additional operations such as noise filtering and corrections for chromatic aberration.

The color synthesis module 108 performs a color synthesis (demosaicing) operation. Accordingly, the color synthesis module 108 converts RAW data in Bayer space into RBG data based on estimates of missing color components in the RAW data. The color correction module 110 performs a color correction operation. Accordingly, the color correction module 110 may compensate for spectral characteristics of the CFA 18. The output module 112 may convert the color space of a captured image and/or output the captured image to the display/storage device 36.

The image enhancement module 111 may perform various image processing operations. For example, the image enhancement module 111 may perform at least one of a noise filtering operation, an edge enhancement operation, a tone curve adjustment, and a contrast enhancement operation. The image enhancement module 111 may perform an edge boost operation on a luminance channel (i.e., the Y component in YCbCr data).

The statistics module 114 gathers statistics to support various operations of the multi-zone system 100. For example, the statistics module 114 gathers statistics to support the AWB, AE, and AF operations. The statistics module 114 assigns zone values to regions of the pixel array (i.e., defines zones of the pixel array). The statistics module 114 then collects statistics from the regions of the pixel array according to the zone value associated with the region. Accordingly, the statistics module 114 stores pixel data according to the zone where the pixel data was collected.

The statistics module 114 may map one of eight zone values to each of the regions of the pixel array. The mapping of the zone values to the regions of the pixel array is programmable. The statistics module 114 gathers image data from various points in the image processing module, allowing statistics to be collected in parallel with other pixel processing operations. While the statistics module 114 is described as mapping eight zones values, the statistics module 114 may map more or less than eight zone values to the pixel array.

The statistics module 114 may be a hardware or software based implementation. In one embodiment, the statistics module 114 may gather and analyze scene content in order to set up different parameters within the image processing pipeline.

The statistics module 114 gathers statistics in order to determine the type of the illuminant present (e.g., incandescent or daylight). Based on the type of illuminant, parameters within the image processing pipeline may be changed to compensate for the response of the CFA 18, and thus make white appear white, even though a different color balance may be acquired due to the illuminant.

The AWB control module 116 may set channel gains based on statistics gathered by the statistics module 114. The channel gains may be set in both the analog and digital domains. The color correction module 110 may control color correction for the AWB operation based on the type of illuminant (e.g., via a color correction matrix).

The statistics module 114 gathers statistics in order to determine a level of illumination. The AE control module 118 sets up exposure parameters for the image sensor based on the statistics gathered by the statistics module 114. For example, the AE control module 118 sets up exposure parameters for the image sensor 16 in terms of gain and exposure time.

The statistics module 114 gathers statistics in order to perform the AF operation. The AF control module 120 analyzes edge detail of the image based on the statistics gathered by the statistics module 114. The AF control module 120 interacts with the focus module 38 to control actuation of a motor (not shown) to move the lens assembly 12 in and out of focus.

Figure 3:
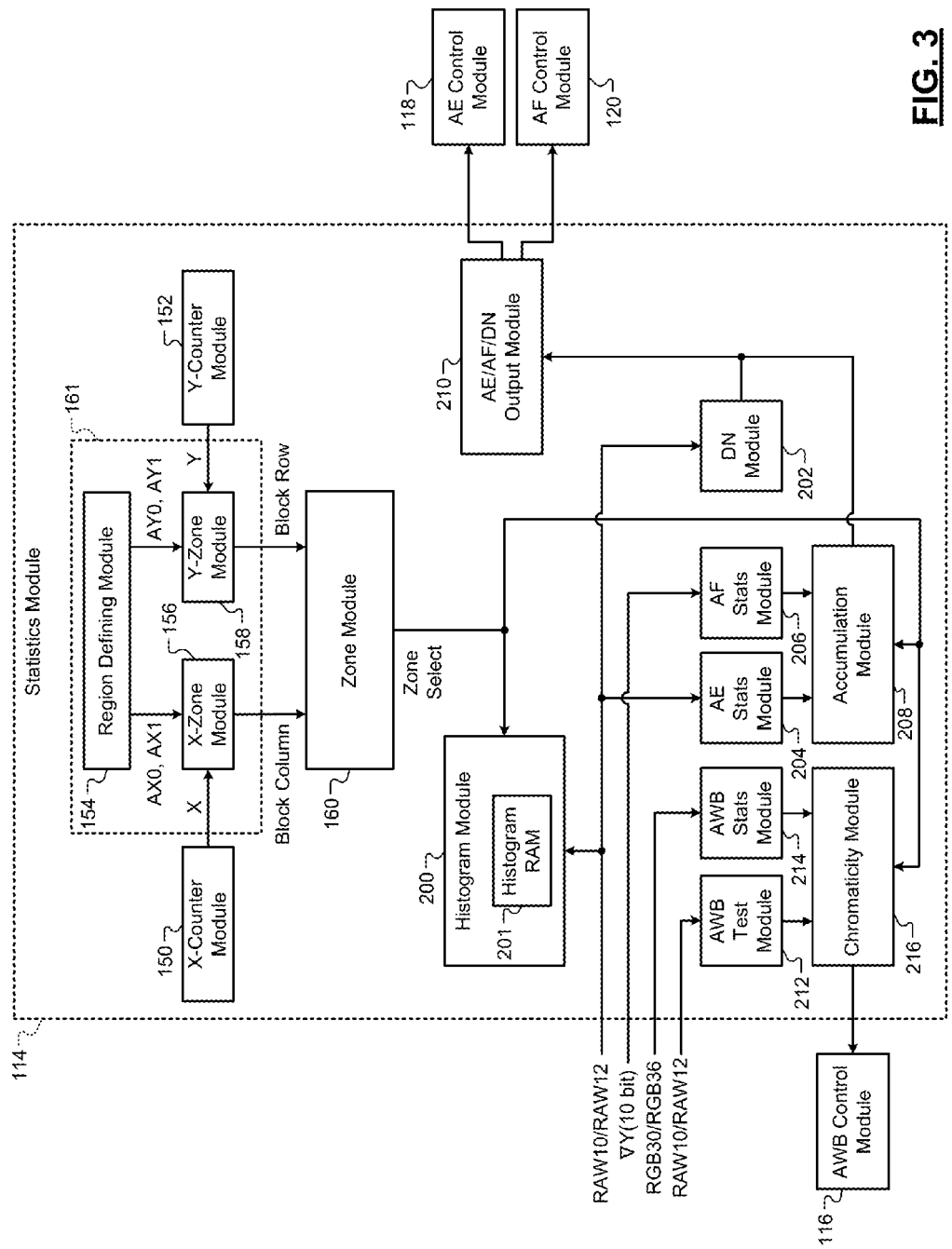
FIG. 3 is a functional block diagram of a statistics module according to the present disclosure.

Referring now to FIG. 3, a detailed view of the statistics module 114 is shown. The statistics module 114 includes an X-counter module 150 and a Y-counter module 152. The X-counter module 150 and the Y-counter module 152 determine a location of a current pixel in the image processing pipeline (i.e., an address of the current pixel read from the image sensor 16). For example, the X-counter module 150 indicates a column location of the current pixel and the Y-counter module 152 indicates a row location of the current pixel.

A region defining module 154, an X-zone module 156, a Y-zone module 158, and a zone module 160 enable zone based statistics collection for each of the eight zones via a zone select signal. The region defining module 154 defines an active region of the pixel array. The zone module 160 maps zone values to portions of the active region. The X-zone module 156 and the Y-zone module 158 determine a location of the current pixel in the active region (i.e., which block of the active region includes the current pixel). The zone module 160 determines which zone value corresponds to the location of the current pixel. The zone module 160 generates the zone select signal that indicates which zone value corresponds to the current pixel. Accordingly, the statistics module 114 may store data corresponding to the current pixel in the image processing pipeline based on the zone select signal.

The region defining module 154 defines the active region of the pixel array using four pixel coordinates. Two X values (AX0, AX1) define a width of the active region. Two Y values (AY0, AY1) define the height of the active region. Accordingly, the four coordinates that define a perimeter of the active region include (AX0, AY0), (AX0, AY1), (AX1, AY0), and (AX1, AY1). The four coordinates that define the active region may be referred to hereinafter as "active region coordinates."

Figure 4A:
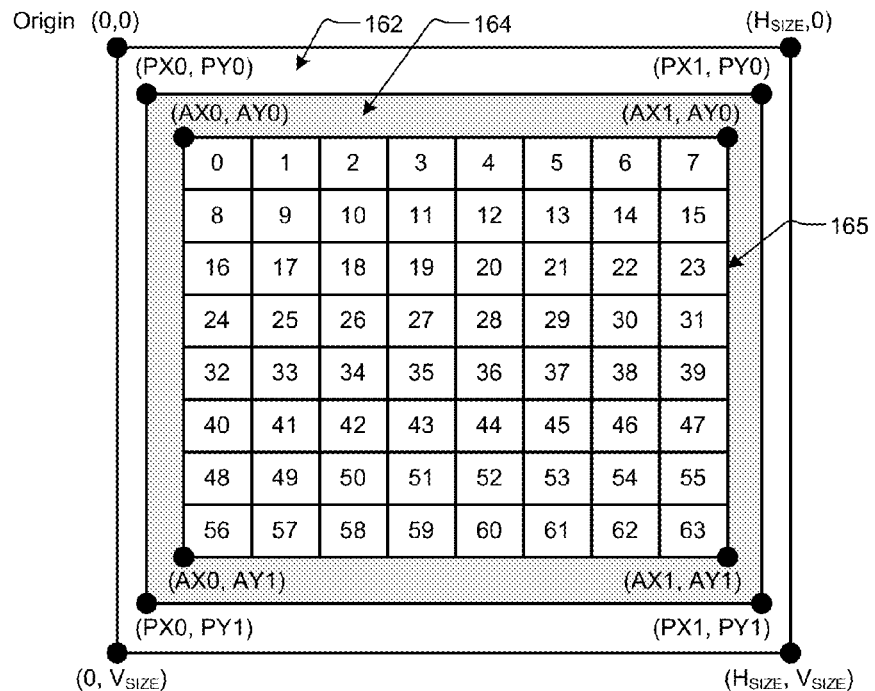
FIG. 4A illustrates a first active region that is partitioned into an array of blocks according to the present disclosure.
Figure 4B:
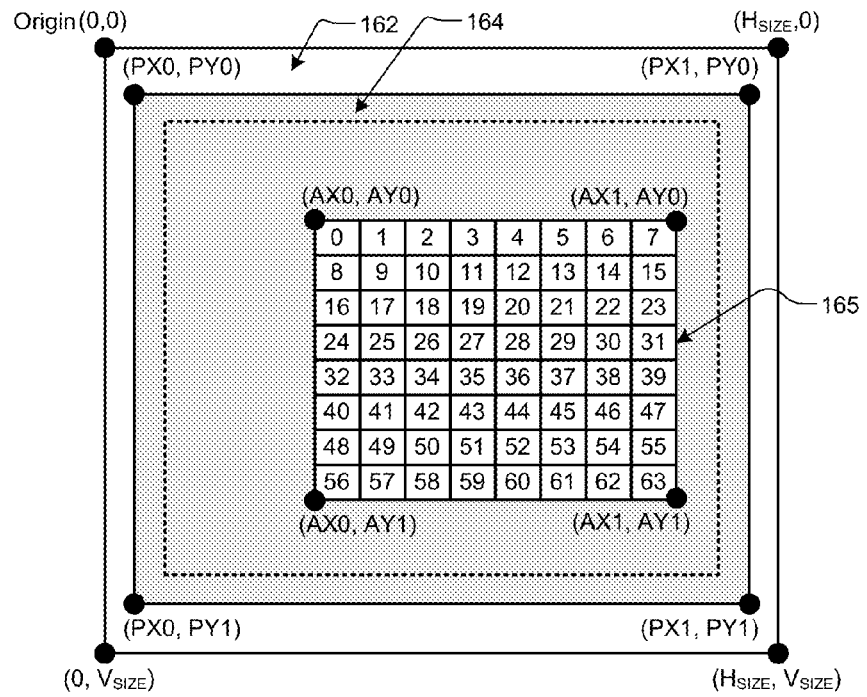
FIG. 4B illustrates a second active region that is partitioned into an array of blocks according to the present disclosure.

Referring now to FIGS. 4A-4B, regions of the image sensor 16 are shown. The dimension of the entire pixel array is indicated as $H_{SIZE} \times V_{SIZE}$. The pixel array includes a dark region 162, a pre-filter region 164, and the active region 165.

The dark region 162 may be an outer region of the pixel array that is shadowed, for example with a metal cover. The pre-filter region 164 may be a buffering of pixels between the active region and the dark region 162. The pixels of the pre-filter region 164 may be exposed to light, but may not be considered part of the active region.

The active region in FIGS. 4A-4B is defined by the active region coordinates. The active region in FIGS. 4A-4B is illustrated as being partitioned into an 8×8 array of blocks (0-63). The blocks illustrate the granularity of the zone definitions. A different zone value may be mapped to each of the blocks. In other words, the zone module 160 maps a zone value to each of the 64 blocks. Accordingly, each of the blocks 0-63 corresponds to one of 8 zone values. While the zone module 160 is described as mapping zone values to 64 blocks of the active region, the zone module 160 may be configured to map zone values to more or less than 64 blocks. While each of the 64 blocks are described as corresponding to one of 8 zones, each of the 64 blocks may each correspond to one of more or less than 8 zones. In one embodiment, the zone module 160 may map zone values to shapes other than blocks.

For example, a zone value may be mapped to the center blocks (e.g., 27, 28, 35, 36) when a user wants to focus on the center of the active region. The statistics module 114 may gather statistics for the zone value that is mapped to the center of the active region. The AF control module 120 may then apply the AF operation to the center based on the statistics corresponding to the zone value mapped to the center of the active region. Simultaneously, the statistics module 114 may gather statistics corresponding to other zone values in order to support the AWB, AE, and AF operations while the statistics are gathered in the center of the active region for the AF operation.

Referring back to FIG. 3, the X-zone module 156, the Y-zone module 158, and the zone module 160 define which of the 8 zone values corresponds to each of the 64 blocks. The X-zone module 156 determines which column of blocks includes a current pixel in the image processing pipeline. The X-zone module 156 determines a column address indicating the column of blocks that includes the current pixel. The Y-zone module 158 determines which row of blocks includes the current pixel. The Y-zone module 158 determines a row address indicating the row of blocks that includes the current pixel. A combination of the column and row addresses determined by the X-zone module 156 and the Y-zone module 158, respectively, may be referred to hereinafter as a zone map address.

Accordingly, the region defining module 154, the X-zone module 156, and the Y-zone module 158 associate pixel values generated by the pixel array of the image sensor 16 with an array of blocks. The region defining module 154, the X-zone module 156, and the Y-zone module 158 may collectively be referred to as a block module 161. The zone module 160 generates the zone select signal based on the zone map address.

Referring now to FIGS. 5A-5B, the zone module 160 maps a zone value to each of the blocks. FIG. 5A is an illustration of zone values that correspond to row and column addresses. Eight zone values Z0-Z7 are illustrated. Each of the blocks includes one of the eight zone values. FIG. 5B illustrates zone values corresponding to the zone map address in a tabular form. The three left most bits of the zone map address correspond to the column address determined by the X-zone module 156. The three right most bits of the zone map address correspond to the row address determined by the Y-zone module 158.

Referring back to FIGS. 4A-4B, the size of the active region may be adjusted based on the active region coordinates. Accordingly, the number of pixels included in the active region may be increased or decreased based on setting the active region coordinates. Specifically, the number of pixels included in the active region may decrease when the size of the active region is decreased. The active region in FIG. 4B illustrates a decrease in size relative to the active region in FIG. 4A.

Although the number of pixels included in the active region may decrease, the number of blocks included in the active region may not change. Accordingly, one of eight zones may still be mapped to each of the 64 blocks when the size of the active region is decreased. Accordingly, the multi-zone system 100 maintains zone definition when the size of the active region is adjusted.

Figure 6:
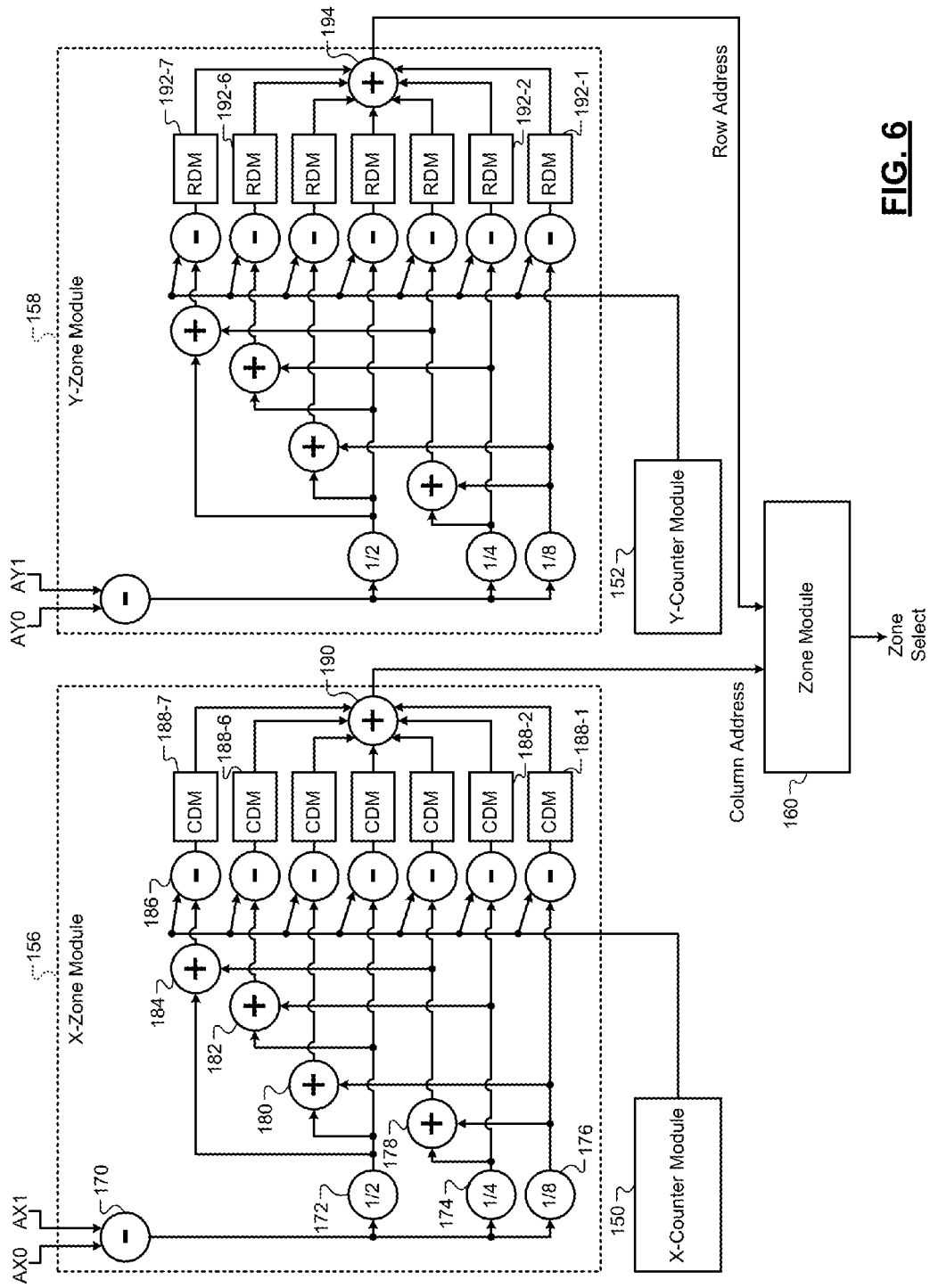
FIG. 6 is a functional block diagram of an X-zone module and a Y-zone module according to the present disclosure.

Referring now to FIG. 6, exemplary operation of the X-zone module 156 and the Y-zone module 158 is shown. Operation of the X-zone module 156 and the Y-zone module 158 is now discussed with reference to the X-zone module 156. The X-zone module 156 determines which column of the eight columns of blocks includes the current pixel in the image processing pipeline.

A subtraction module 170 determines a difference between the X coordinates AX0 and AX1. The difference of AX0 and AX1 corresponds to a width of the active region. A first division module 172, a second division module 174, and a third division module 176 divide the difference by 2, 4, and 8, respectively. Addition modules 178, 180, 182, and 184 sum components of the difference to determine 3/8, 5/8, 6/8, and 7/8 of the difference, respectively. Subtraction modules 186 then determine a difference between the X coordinate of the current pixel and the components (1/8, 2/8, . . . , 7/8) of the difference between AX0 and AX1.

Column determination modules (CDM) 188-1, 188-2, . . . , 188-6, and 188-7 (hereinafter "CDM 188") output either a 0 or a 1, depending on whether the difference between the X coordinate of the current pixel and the components (1/8, 2/8, . . . , 7/8) of the difference between AX0 and AX1 are greater than 0. In other words, a first CDM 188-1 outputs a value of 0 when the X coordinate of the current pixel is not greater than a width of the first column of blocks (0, 8, . . . , 56). The first CDM 188-1 outputs a value of 1 when the X coordinate of the current pixel is greater than the width of the first column of blocks.

The second CDM 188-2 outputs a value of 1 when the X coordinate of the current pixel is greater than a maximum X coordinate included in the second column of blocks (1, 9, . . . , 57). The seventh CDM 188-7 outputs a value of 1 when the X coordinate of the current pixel is greater than a maximum X coordinate included in the seventh column of blocks (6, 14, . . . , 62).

A summation module 190 may sum the outputs of each of the CDMs 188 to determine the column address. The sum of the outputs of each of the CDMs 188 may range from 000 to 111. For example, when the X coordinate of the current pixel is in the sixth column of blocks (5, 13, . . . , 61), the column address is 101.

The Y-zone module 158 operates similarly to the X-zone module 156. The Y-zone module 158 determines the row address based on a difference between the Y-coordinates of the active region. The Y-zone module 158 includes row determination modules (RDM) 192-1, 192-2, . . . , 192-6, and 192-7 (hereinafter "RDM 192") that output either a 0 or a 1, depending on the Y coordinate of the current pixel. Accordingly, a summation module 194 sums the outputs of each of the RDMs 192 to determine the row address.

Referring back to FIG. 3, the histogram module 200 stores data corresponding to the eight zone values. The histogram module 200 receives the zone select signal and stores data corresponding to the current pixel based on the zone select signal. The histogram module 200 may include a histogram random access memory (RAM) 201 that stores a histogram corresponding to each of the zone values. Accordingly, the histogram RAM 201 may include eight histograms. For example, the histogram RAM 201 stores data corresponding to zone eight in a histogram for zone eight when the zone select signal indicates that a current pixel in the pipeline is mapped to a zone value of eight.

Each of the eight histograms stored in the histogram RAM 201 may include a number of counts of red, green, and blue pixels that fall within a range of intensities. For example, a histogram may indicate a number of red pixels that correspond to a first intensity, a number of red pixels that correspond to a second intensity, etc. Pixel data for the histogram RAM 201 is collected in Bayer space (e.g., RAW10/RAW12).

The histograms may include a varying number of bins. For example, a 10-bit image may include 1024 bins. However, 1024 bins may require a large amount of memory for multiple zones. Accordingly, a number of bins in the histograms may be limited (e.g., to 64 or 256 bins). When a limited number of bins are used, a limited number of bits of the pixel value may be used to bin the pixel value in the corresponding bins. For example, the upper 6 or 8 bits of the pixel value may be used to bin the pixel value.

The dark noise (DN) module 202 may collect statistics from RAW data. The DN module 202 may determine an amount of noise in the multi-zone system 100 based on data from pixels in the dark region 162. The DN module 202 may determine an average value of dark noise and a mean deviation of the dark noise based on pixel data from the dark region 162. The DN module 202 sets a level for a black level clamp based on the average value of dark noise. The DN module 202 may also establish thresholds for edge adaptive operations based on a mean deviation of the dark noise.

The AE statistics module 204 collects data on a per-zone basis. The AE statistics module 204 collects data based on RAW10/RAW12 data. A minimum R value (RMIN), maximum R value (RMAX), and a sum of the R values (RSUM) are collected by the AE statistics module 204. The AE statistics module 204 also determines minimum, maximum, and sum values for the green and blue channels. The AE statistics module 204 may also read from the histogram RAM 201. Accordingly, the AE control module 118 controls the AE operation of the multi-zone system 100 based on the data from the histogram RAM 201 for each of the eight zone values along with maximum, minimum, and sum values for each of the channels.

An AF statistics module 206 collects edge statistics on a per-zone basis. An accumulation module 208 accumulates the edge strength based on the convolution of the luminance value with a 2D high pass filter. The accumulation module 208 may accumulate the edge strength on a per-zone basis. The sum of each of the edge strengths may be divided by a number of pixels corresponding to the zone that was accumulated to determine an average value.

An AE/AF/DN output module 210 (hereinafter "output module 210") includes output registers for the AE operation, the AF operation, and the DN operation for each of the zones. The AE control module 118 and the AF control module 120 read from output registers of the output module 210. The output module 210 gathers maximum and minimum values of the R, G, and B channels for the AE operation. The output module 210 may also gather the sum of the R, G, and B channels (e.g., sums of pixel values) for the AE operation. The output module 210 collects edge statistics (e.g., an edge sum) for the AF operation. The output module 210 gathers the data from the dark region pixels for the DN operation.

An AWB test module 212, an AWB statistics module 214, and a chromaticity module 216 gather zone based statistics for the AWB operation. The chromaticity module 216 includes zone based chromaticity grids. Accordingly, the chromaticity module 216 includes eight chromaticity grids. The AWB control module 116 may use the data included in the chromaticity module 216 for the AWB operation.

The eight chromaticity grids may each be 16×16 grids. The chromaticity grids are two dimensional histograms that allow for evaluation of how many pixels have fallen within different regions of a chromaticity space. While the size of the chromaticity grids are described as 16×16, the size of the chromaticity grids may be greater than 16×16. A size of the chromaticity grids may be chosen based on a tradeoff between performance of the hardware and cost of the hardware used to implement the chromaticity grids.

The AWB control module 116 determines a color temperature based on the chromaticity grids. The AWB control module 116 determines the channel gain settings for white balance based on the chromaticity grids. The color correction module 110 may determine a color correction matrix to apply to adjust for a spectral sensitivity of the CFA 18 based on the chromaticity grids.

Figure 7:
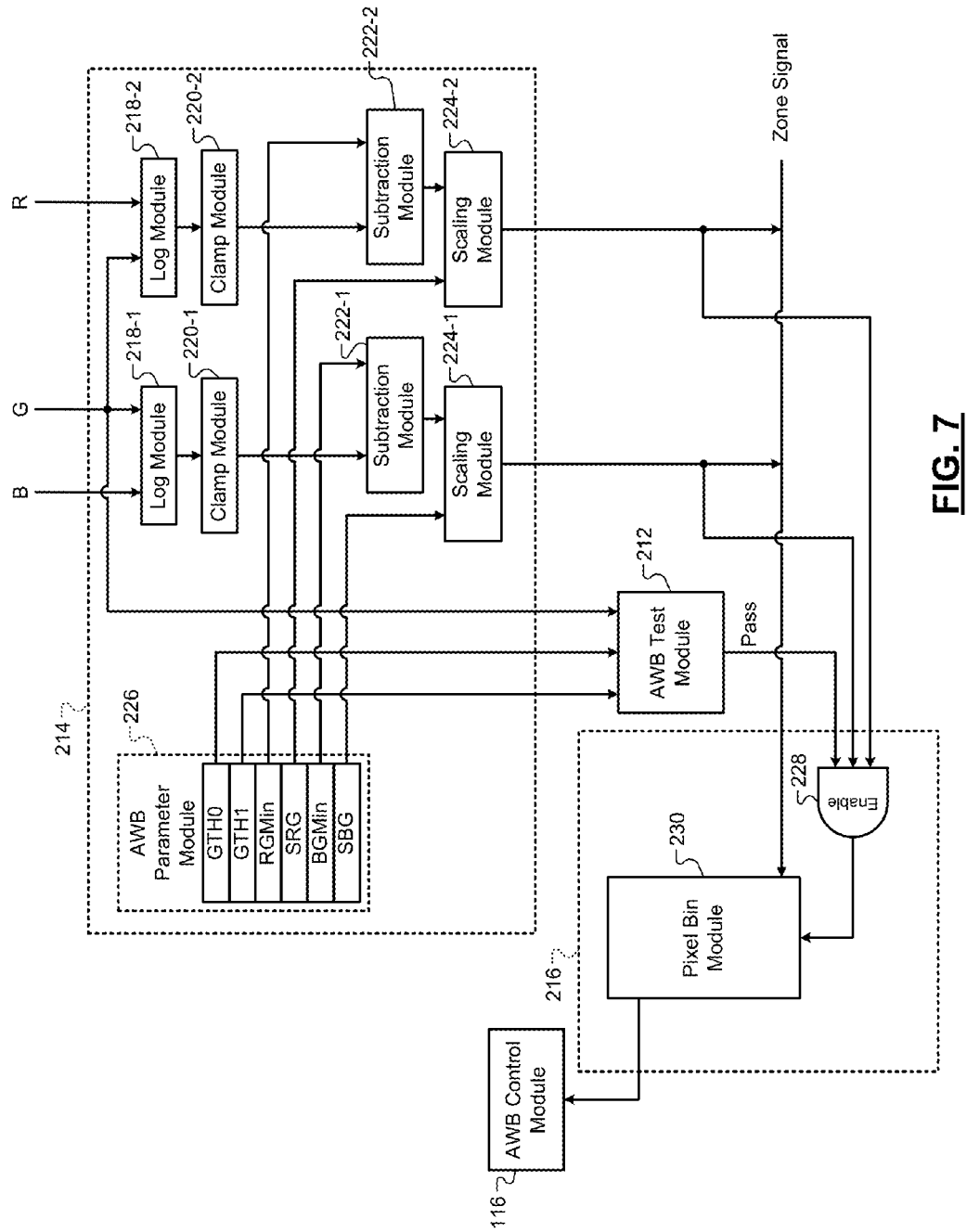
FIG. 7 is a functional block diagram of an auto-white balance (AWB) statistics module and a chromaticity module according to the present disclosure.

Referring now to FIG. 7, statistics for the AWB operation are gathered using the AWB statistics module 214, the AWB test module 212, and the chromaticity module 216. During capture of an image, statistics are gathered for the AWB operation in order to identify the illuminant and color temperature of the image. The AWB control module 116 adjusts channel gains based on the statistics gathered for the AWB operation.

The AWB statistics module 214 determines whether a current pixel (in RGB space) in the image processing pipeline falls within a programmable chromaticity space. When an RGB pixel falls within the chromaticity space, the chromaticity module 216 stores the location of the current pixel in chromaticity space in a histogram that corresponds to the zone value that includes the current pixel. The AWB test module 212 performs a brightness test on the green channel of the current pixel. The AWB test module 212 enables collection of data corresponding to the current pixel when the green channel pixel value falls within a threshold brightness range.

Figure 8:
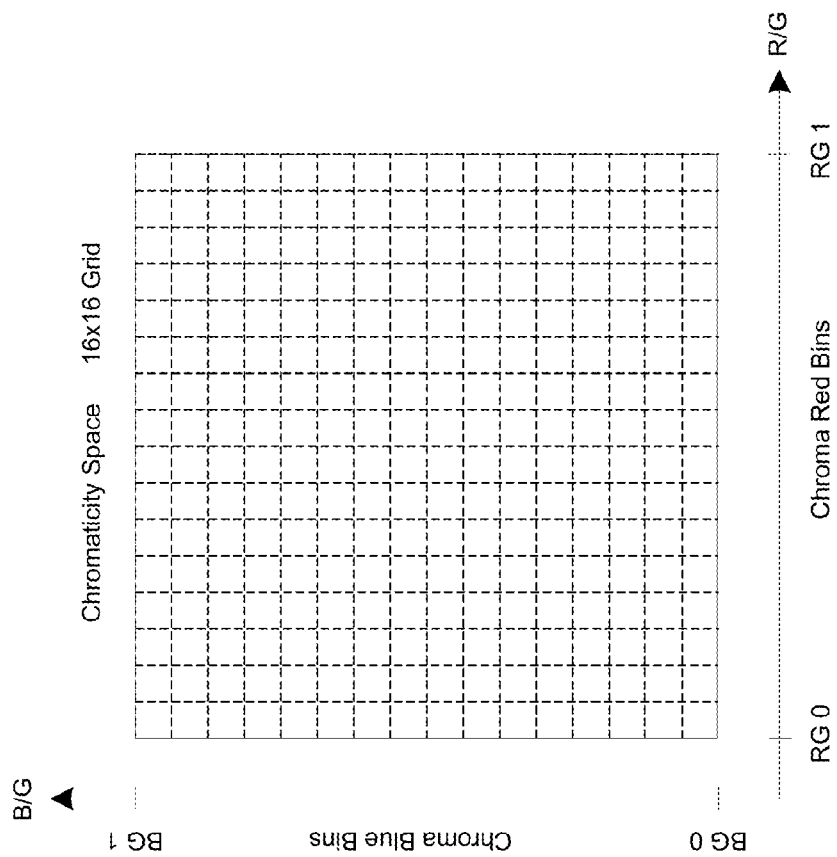
FIG. 8 illustrates a 16×16 chromaticity grid according to the present disclosure.

Referring now to FIG. 8, a chromaticity space is defined by a 16×16 grid. The chromaticity module 216 includes a chromaticity grid for each of the eight zone values. Accordingly, the chromaticity module 216 includes eight 16×16 chromaticity grids. While the chromaticity module 216 is described as including eight 16×16 chromaticity grids, the chromaticity module 216 may include more or less chromaticity grids having varying sizes.

Referring back to FIG. 7, operation of the AWB statistics module 214, the AWB test module 212, and the chromaticity module 216 will now be discussed. The AWB statistics module 214 determines which chromaticity grid each RBG pixel falls within. The AWB statistics module 214 includes log modules 218-1, 218-2, clamp modules 220-1, 220-2, subtraction modules 222-1, 222-2, and scaling modules 224-1, 224-2.

The AWB statistics module 214 controls the gathering of statistics relating to the AWB operation based on various programmable parameters. The AWB statistics module 214 includes an AWB parameter module 226 that includes the programmable parameters. The programmable parameters include GTH0 and GTH1, which are minimum and maximum thresholds for a brightness test performed by the AWB test module 212, respectively. GTH0 and GTH1 may be unsigned integers. The programmable parameters include RGMin and BGMin which are minimum grid ranges for the log(R/G) axis and the log(B/G) axis of the chromaticity grid, respectively. RGMIN and BGMIN may be unsigned fractions. The programmable parameters include SRG and SBG which are grid spacings for the log(R/G) and log(B/G) axis of the chromaticity grid, respectively. SRG and SBG may be unsigned fractions.

Referring back to FIG. 8, a 16×16 chromaticity grid is shown. The chromaticity grid includes a red chroma axis and a blue chroma axis. The 16×16 grid ranges from RG0 to RG1 on the red chroma axis and ranges from BG0 to BG1 on the blue chroma axis.

Referring back to FIG. 7, SBG and SRG represent the grid spacing with channel gain compensation applied. SBG and SRG may be determined based on the following equations:

$$SBG = \frac{N}{(BG1 - BG0)} \frac{Ggain}{Bgain} \quad \text{(Eq. 1)}$$

$$SRG = \frac{N}{(RG1 - RG0)} \frac{Ggain}{Rgain} \quad \text{(Eq. 2)}$$

where N is a number of grid spacings along an axis, and where Ggain, Bgain, and Rgain, are the gain values applied to the green, blue, and red channels, respectively.

RGMin and BGMin represent the minimum values of the grid range for log(R/G) and log(B/G) with channel gain compensation applied, respectively. RGMin and BGmin may be based on the following equations:

$$RGMin = \frac{Rgain}{Ggain} RG0 \quad \text{(Eq. 3)}$$

$$BGMin = \frac{Bgain}{Ggain} BG0 \quad \text{(Eq. 4)}$$

The log modules 218-1, 218-2 determine the relative ratios of R/G and B/G, respectively. The log modules 218-1, 218-2 determine log(R/G) and log(B/G) since the axes of the chroma space are defined by log(R/G) and log(B/G). The log modules 218-1, 218-2 may determine the log values of R, G, and B based on a look-up table stored in memory. Accordingly, the log modules 218-1, 218-2 determine log(R), log(B), and log(G) based on look-up tables.

The log modules 218-1, 218-2 then determine log(R/G) based on the subtraction of log(G) from log(R) and determine log(B/G) based on the subtraction of log(G) from log(B). The clamping modules 220-1, 220-2 clamp the value of the log operation to an unsigned fraction of predetermined precision.

The subtraction modules 222-1, 222-2 subtract RGMin from log(R/G) and BGMin from log(B/G). The scaling modules 224-1, 224-2 multiply the results from the subtraction modules 222-1, 222-2 by SRG and SBG. Accordingly, the subtraction modules 222-1, 222-2 and scaling modules 224-1, 224-2 may determine a grid coordinate (e.g., a row and column of the 16×16 chromaticity grid to which the current pixel belongs). The grid coordinates may be based on the following equations:

$$I_{log(R/G)} = \text{floor}\left[SRG \times \left(\log\frac{R}{G} - RGMin\right)\right] \quad \text{(Eq. 5)}$$

$$J_{log(B/G)} = \text{floor}\left[SBG \times \left(\log\frac{B}{G} - BGMin\right)\right] \quad \text{(Eq. 6)}$$

where $I_{log(R/G)}$ and $J_{log(B/G)}$ represent the coordinates in chroma space along the log(R/G) and log(B/G) axes, respectively. Both $I_{log(R/G)}$ and $J_{log(B/G)}$ may be unsigned fractions, which may be clamped to unsigned integer values. Both $I_{log(R/G)}$ and may be concatenated with the zone value to which the $J_{log(B/G)}$ pixel belongs. The concatenated value represents a memory address indicating the zone value and the chromaticity space of the current pixel. For example, the concatenated value represents a memory address in a pixel bin module 230.

The AWB test module 212 performs a brightness test on the green channel to eliminate pixels which are either too dark or too bright with respect the brightness thresholds (GTH0, GTH1). The comparison of the green channel to the brightness thresholds passes if the green channel pixel value falls between the brightness thresholds.

The chromaticity module 216 includes an enabling module 228 that enables gathering of statistics in the pixel bin module 230 based on enabling criteria. The pixel bin module 230 includes the chromaticity grids. Accordingly, the pixel bin module 230 stores data corresponding to the current pixel in the image processing pipeline based on which zone value corresponds to the current pixel and where the current pixel is located on the chromaticity grid. The pixel bin module 230 stores data corresponding to the current pixel when the enabling module 228 determines that the enabling criteria are met.

The enabling module 228 determines that the enabling criteria are met when 1) the pixel falls within the chromaticity space defined by the chromaticity grid and 2) the pixel passes the brightness test performed by the AWB test module 212. In other words, the enabling criteria are met when the following logical statement is true:

$$(GTH0 \leq G \leq GTH1) \cdot (0 \leq I_{log(R/G)} \leq (N-1)) \cdot (0 \leq J_{log(B/G)} \leq (N-1))$$

The pixel bin module 230 increments a chromaticity bin corresponding to the location of the current pixel in the chromaticity grid and the zone value when the enable criteria are met.

The AWB control module 116 controls the AWB operation based on the data stored in the chromaticity module 216. For example, the AWB control module 116 may adjust channel gains based on the data stored in the pixel bin module 230.

Figure 9:
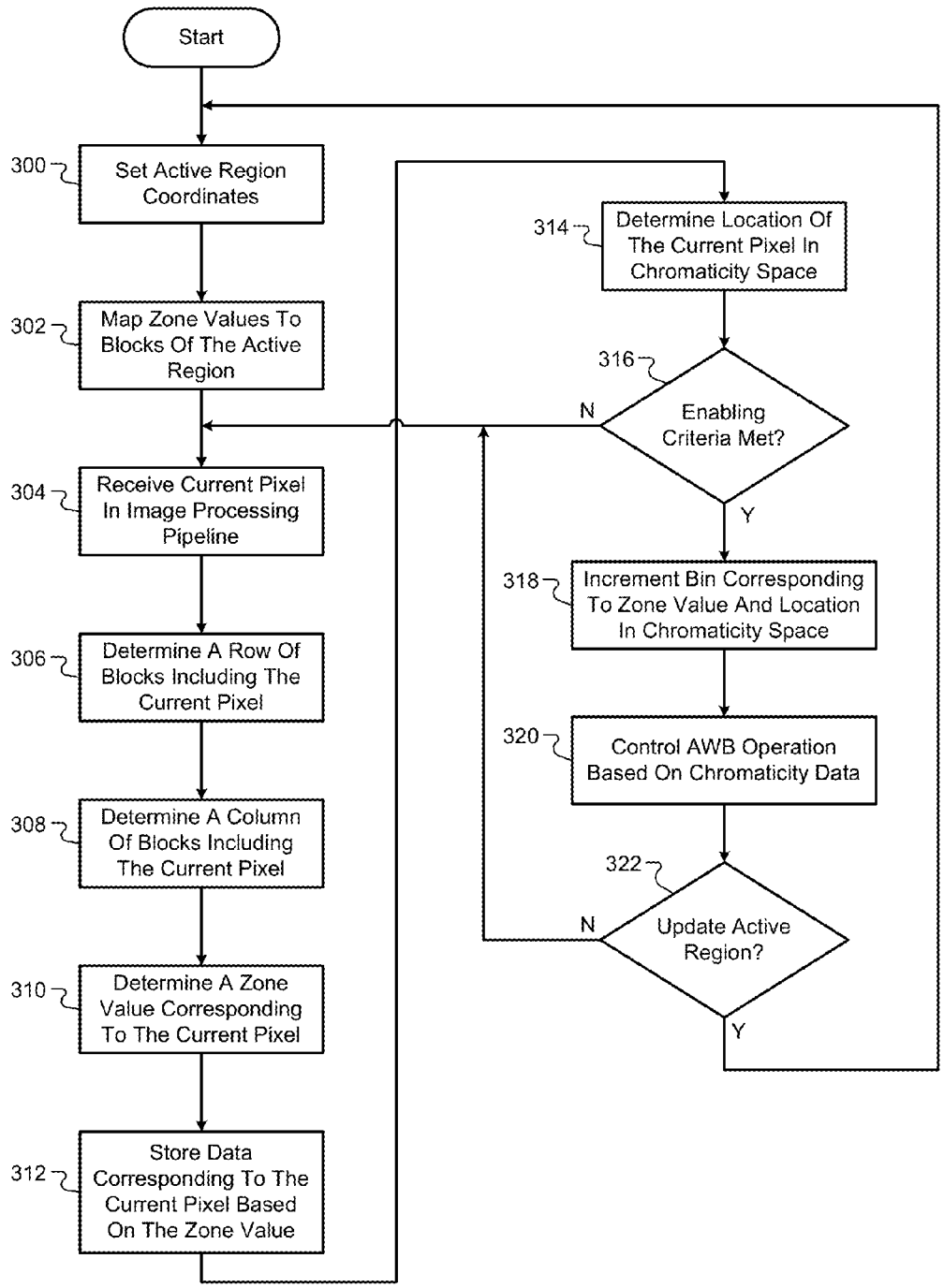
FIG. 9 illustrates a method for controlling an AWB operation in the image capture system that includes multiple zone statistical analysis according to the present disclosure.

Referring now to FIG. 9, a method for controlling an AWB operation in a multi-zone system starts at 300. At 300, the region defining module 154 sets the coordinates of the active region. At 302, the zone module 160 maps the zone values to the blocks of the active region. At 304, the image processing module 102 receives the current pixel in the image processing pipeline. At 306, the Y-zone module 158 determines a row of blocks including the current pixel. At 308, the X-zone module 156 determines a column of blocks including the current pixel. At 310, the zone module 160 determines a zone value corresponding to the current pixel. At 312, the statistics module 114 stores data corresponding to the current pixel based on the zone value.

At 314, the AWB statistics module 214 determines the location of the current pixel in chromaticity space. At 316, the enabling module 228 determines whether the enabling criteria are met. If the result at 316 is false, the method continues at 304. If the result of 316 is true, the method continues at 318. At 318, the pixel bin module 230 increments a bin corresponding to the zone value and the location of the current pixel in chromaticity space. At 320, the AWB control module 116 controls the AWB operation based on the chromaticity data included in the pixel bin module 230. At 322, control determines whether to update the active region. If the result at 322 is false, the method continues at 304. If the result at 322 is true, the method continues at 300.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
   a block module configured to associate pixel values, generated by pixel sensors of an image sensor, with M sub-regions, wherein the pixel values correspond to an active region of a captured image, and the active region includes the M sub-regions, wherein
   a size of the active region is adjustable, and
   the block module is configured to automatically adjust the respective sizes of each of the M sub-regions based on the size of the active region to maintain a same number of the M sub-regions in the active region;
   a zone module configured to define N zones in the M sub-regions, wherein each of the N zones includes an adjustable number of the M sub-regions, and wherein N and M are integers greater than one and N is less than or equal to M;
   a statistics module configured to gather N sets of statistics corresponding to respective ones of the N zones, wherein, to gather the N sets of statistics, the statistics module is further configured to i) receive a current pixel, ii) determine which one of the N zones corresponds to the current pixel, and iii) store data for the current pixel based on the determined one of the N zones; and a control module configured to adjust, for each of the N zones, pixel values generated by the pixel sensors based on the N sets of the statistics.

2. The system of claim 1, wherein the block module is configured to generate a set of pixel coordinates corresponding to locations of pixel sensors of the image sensor, and wherein the set of pixel coordinates define a perimeter around the M sub-regions.

3. The system of claim 2, wherein the perimeter is a rectangular perimeter, and wherein the set of pixel coordinates includes four pixel coordinates that correspond to corners of the rectangular perimeter.

4. The system of claim 2, wherein the block module is configured to modify the set of pixel coordinates to adjust at least one of the respective sizes and respective positions of the M sub-regions.

5. The system of claim 1, wherein the zone module includes a map that maps each of the N zones to at least one of the M sub-regions.

6. The system of claim 5, wherein the zone module is configured to modify modifies the map to adjust which of the M sub-regions is included in each of the N zones.

7. The system of claim 1, wherein each of the M sub-regions includes contiguous ones of the pixel values.

8. The system of claim 1, wherein the statistics module includes N histograms corresponding to the N sets of the statistics, and wherein each of the N histograms includes counts corresponding to pixel values.

9. The system of claim 8, wherein the counts corresponding to pixel values are based on chromaticity values.

10. The system of claim 9, wherein the control module is configured to adjust pixel values to perform an auto-white balance operation based on at least one of the N histograms.

11. The system of claim 1, wherein the control module is configured to adjust pixel values to perform at least one of an auto-white balance operation, an auto-exposure operation, and an auto-focus operation.

12. The system of claim 1, wherein each of the M sub-regions is a block of contiguous pixels.

13. A method, comprising:

associating pixel values, generated by pixel sensors of an image sensor, with M sub-regions, wherein the pixel values correspond to an active region of a captured image, and the active region includes the M sub-regions, wherein a size of the active region is adjustable, and the respective sizes of each of the M sub-regions are automatically adjusted based on the size of the active region to maintain a same number of the M sub-regions in the active region;

defining N zones in the M sub-regions, wherein each of the N zones includes an adjustable number of the M sub-regions, and wherein N and M are integers greater than one and N is less than or equal to M;

gathering N sets of statistics corresponding to respective ones of the N zones, wherein gathering the N sets of statistics includes i) receiving a current pixel, ii) determining which one of the N zones corresponds to the current pixel, and iii) storing data for the current pixel based on the determined one of the N zones; and adjusting, for each of the N zones, pixel values generated by the pixel sensors based on the N sets of statistics.

14. The method of claim 13, further comprising generating a set of pixel coordinates corresponding to locations of pixel sensors of the image sensor, wherein the set of pixel coordinates define a perimeter around the M sub-regions.

15. The method of claim 14, wherein the perimeter is a rectangular perimeter, and wherein the set of pixel coordinates includes four pixel coordinates that correspond to corners of the rectangular perimeter.

16. The method of claim 14, further comprising modifying the set of pixel coordinates to adjust at least one of the respective sizes and respective positions of the M sub-regions.

17. The method of claim 13, further comprising determining N histograms corresponding to the N sets of the statistics, wherein each of the N histograms includes counts corresponding to pixel values.

18. The method of claim 17, wherein the counts corresponding to pixel values are based on chromaticity values.

19. The method of claim 18, further comprising adjusting pixel values to perform an auto-white balance operation based on at least one of the N histograms.

20. The method of claim 13, further comprising adjusting pixel values to perform at least one of an auto-white balance operation, an auto-exposure operation, and an auto-focus operation.

* * * * *